June 23, 1953 G. E. REDFIELD 2,643,128

RECORD CHANGER

Filed May 1, 1946 6 Sheets-Sheet 1

INVENTOR
GEORGE E. REDFIELD
BY
J. D. Douglass
ATTY.

INVENTOR
GEORGE E. REDFIELD
BY
J. D. Douglass
ATTY.

June 23, 1953 G. E. REDFIELD 2,643,128

RECORD CHANGER

Filed May 1, 1946 6 Sheets-Sheet 3

INVENTOR
GEORGE E. REDFIELD
BY J. D. Douglas
ATTY.

June 23, 1953 G. E. REDFIELD 2,643,128

RECORD CHANGER

Filed May 1, 1946 6 Sheets-Sheet 4

INVENTOR
GEORGE E. REDFIELD
BY
J. D. Douglas
ATTY.

RECORD CHANGER

Filed May 1, 1946 6 Sheets-Sheet 5

INVENTOR
GEORGE E. REDFIELD
BY
J. D. Douglass
ATTY.

RECORD CHANGER

Filed May 1, 1946 6 Sheets-Sheet 6

INVENTOR
GEORGE E. REDFIELD
BY J. D. Douglas
ATTY.

Patented June 23, 1953 2,643,128

UNITED STATES PATENT OFFICE 2,643,128

RECORD CHANGER

George E. Redfield, Chicago, Ill., assignor to Admiral Corporation, Chicago, Ill., a corporation of Delaware Application May 1, 1946, Serial No. 666,379

9 Claims. (Cl. 274—10)

This invention relates to record players and more particularly to improvements in record changers of the so-called automatic type.

A limitation to record changers as commonly constructed is that they involve use of many parts, some of which are intricate of construction. Due, therefore, to the inherent nature of their structures the cost of manufacture for such record changers is comparatively high, and in addition, they are comparatively subject to maladjustment and breakdown, especially when in the hands of inexperienced or careless persons; moreover, considerable skill on the part of a service man is required when a situation calls for repairs or adjustments to the record changers.

A more specific disadvantage of a typical record player of prior construction is that the spindle which is adapted to support a stack of records at their center holes toward the top of the spindle does not always effectively maintain the records where they are intended to be supported until a desirable time has arrived for each of them to be singly dropped to the turntable. This is often due to "weaving," a condition in which the top of the spindle wavers or swings about a point at or below the surface of the turntable. This is because of the manner in which the spindle is associated with the shaft bearing the turntable, a construction because of which slight swaying or rocking of the turntable is imparted to the spindle.

Another disadvantage inherent to the foregoing construction is that of slight and sudden reductions of turntable speed due to the mode of associating the respective means of support for both turntable and spindle. This change of speed gives rise to distortion of sound produced by a record, which peculiar form of distortion is commonly referred to in the trade as "wow."

Owing to the novel features that have been incorporated in my invention, I am able to employ parts which are simple in structure, inexpensive of manufacture and which when effectively associated with each other provide a record player which is less liable of maladjustment or breakdown than previously constructed record players, and which may be more readily repaired in a minimum of time in case of breakdown.

By segregating the support for the spindle of my improved record player from the support afforded the shaft on which the turntable is borne, and by spacing the spindle from the shaft I am able to provide spindle support, for a supply of records spaced above the turntable, which is rigid and unaffected by turntable movements so that dislodging of records from the supply at the wrong moment is obviated.

Due to the novel way in which I mount the spindle of my record player in association with the turntable shaft, I am able to greatly lessen or completely obviate the abrupt reductions of turntable speed, previously referred to.

An additional advantage is to be found in the means I employ to reject a record at any point during the operation of playing the same. The improvements in my means for rejecting means are to be found particularly in the control mechanism which is adapted to be operated manually and from which the motion for rejecting is preferably conveyed by a wire, instead of a rigid link, thus enabling the control mechanism to be more readily mounted in a wide variety of positions to conform to the particular adaptation of the record changer; as for example, its use in cabinets of a wide variety of sizes and shapes.

Additionally an improved support for the pickup arm, and novel means for manipulating said pickup arm are among the advantages involved. Other advantages will be apparent from a consideration of the following description, taken with the accompanying drawings, in which.

Figures 11, 12, 13:
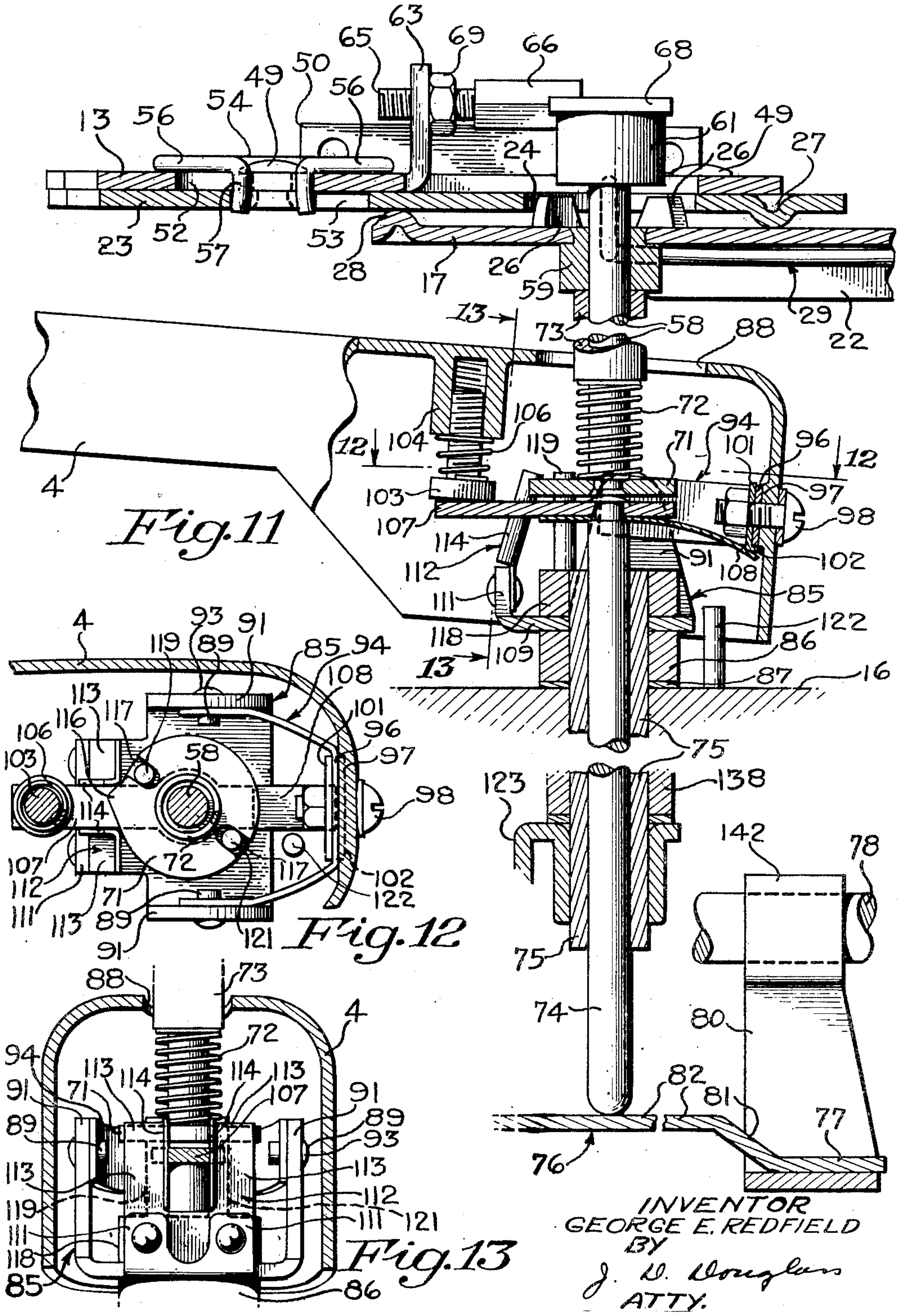
Figures 14, 15, 16, 17:
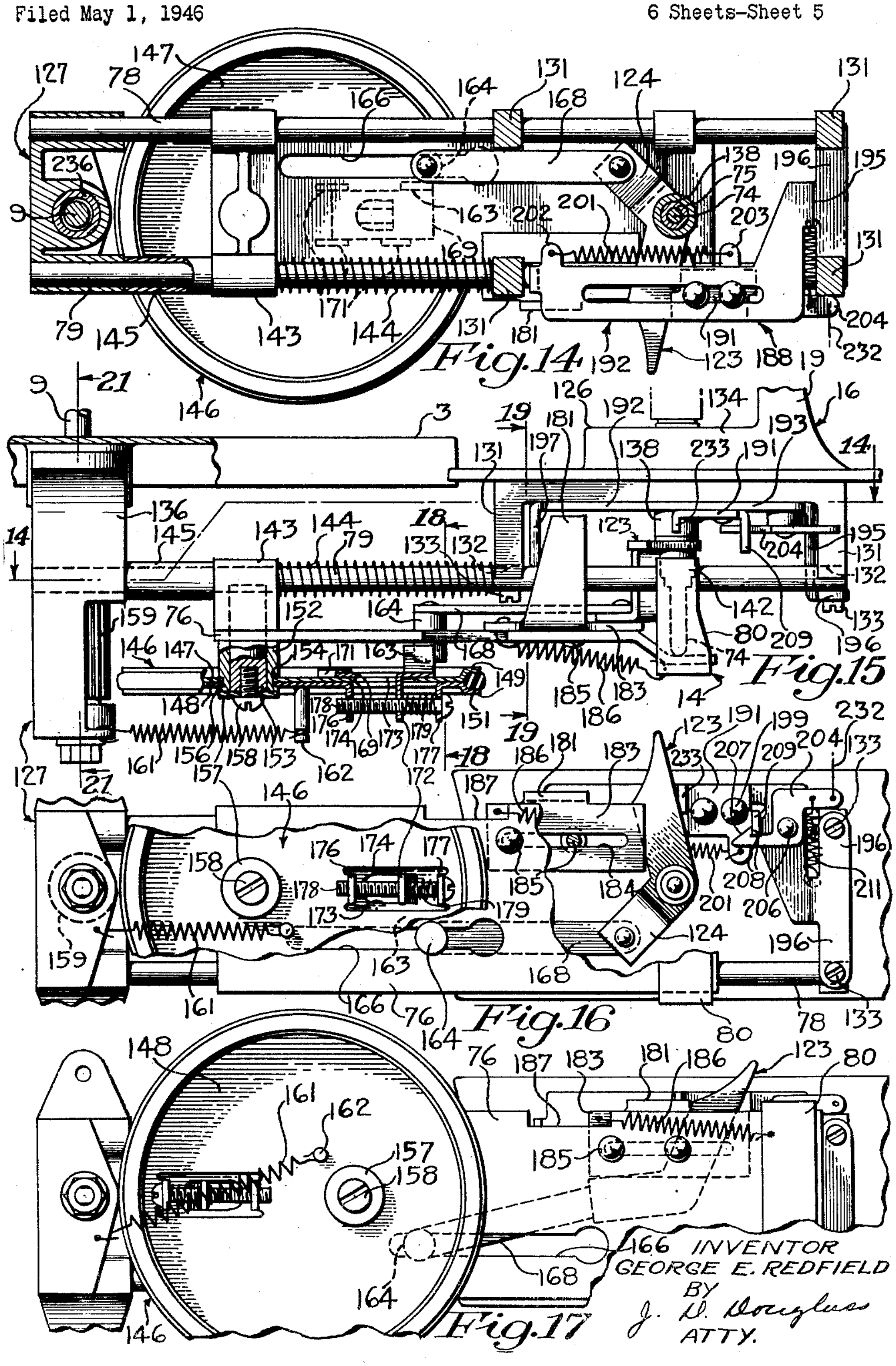
Figures 18, 19, 20, 21, 22:
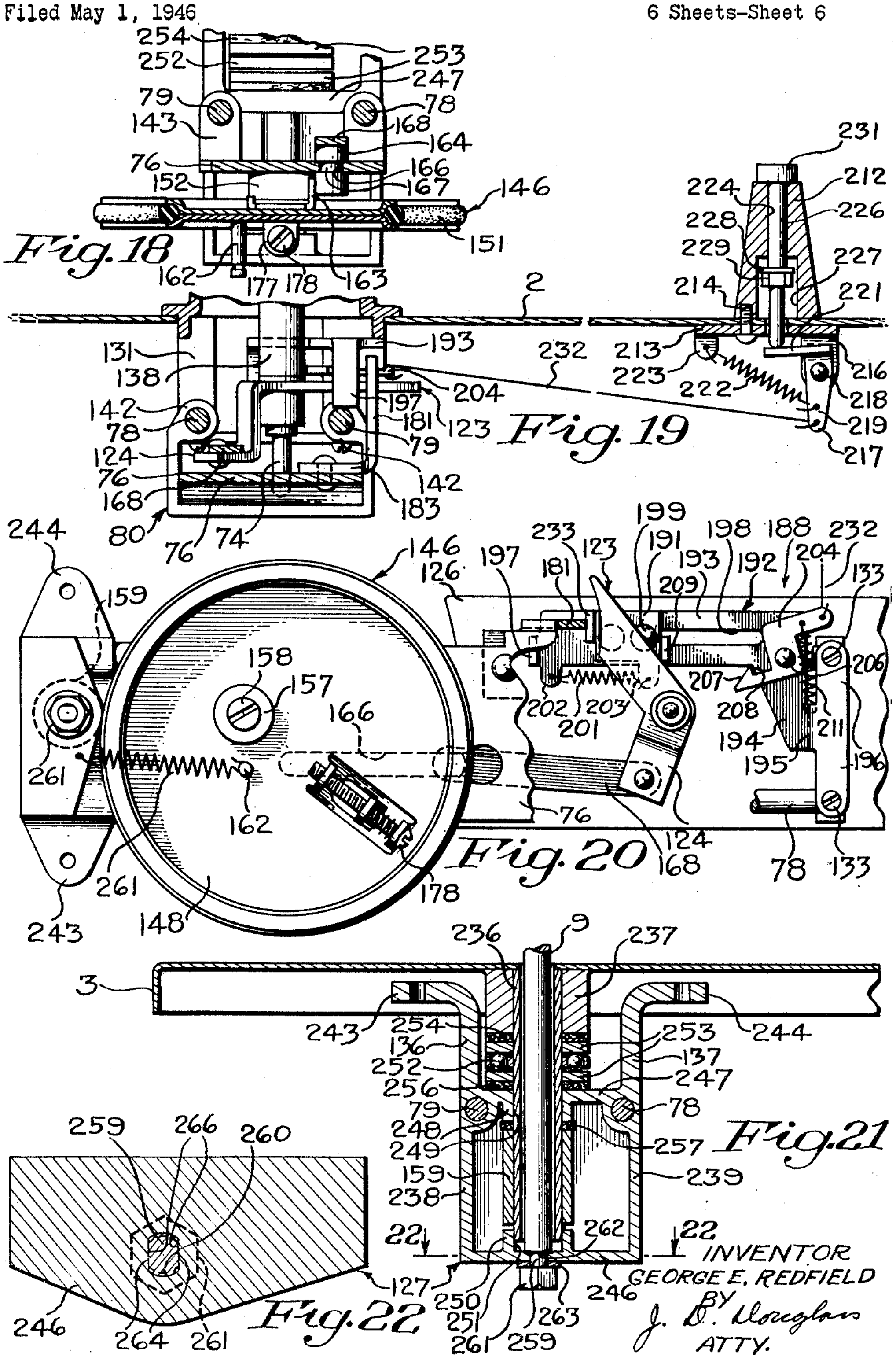

Fig. 11 is a fragmentary view of the ejector head and mechanism to manipulate the same including the lift cam and pickup arm, said arm being supported above and out of engagement with a record by means including a tubular shaft and lift rod which are broken above and below the pickup arm so that said arm can be swung out of its normal arc thereby permitting the structure of the parts to be more effectively observed in the same view;

Fig. 12 is a section taken substantially on line 12—12 of Fig. 11, the parts being in the position they occupy when the pickup arm is in its extreme upward and outward position;

Fig. 13 is a sectional view taken substantially on line 13—13 of Fig. 11;

Fig. 14 is a sectional view taken on line 14—14 of Fig. 15 to show the mechanism adapted to manipulate the pickup arm and ejector head, the parts being shown as having been drawn to a reduced scale;

Fig. 15 is a fragmentary view, in side elevation, of the mechanism shown in Fig. 14 parts being broken away to disclose the structures of underlying details of construction;

Fig. 16 is a fragmentary bottom plan view of the mechanism shown in Figs. 14 and 15, parts being broken away to disclose the structures of underlying parts;

Fig. 17 is an additional fragmentary bottom plan view of the mechanism shown in Fig. 15, the eccentric wheel having been rotated through a half turn from the Fig. 16 position and the movable frame moved to its extreme position at the right;

Fig. 18 is a vertical section taken substantially on line 18—18 of Fig. 15;

Fig. 19 is a vertical section, taken on line 19—19 of Fig. 15, the manually operated trip mechanism being shown therewith;

Fig. 20 is a fragmentary bottom plan view of the mechanism shown in Fig. 16, the trigger mechanism having been actuated;

Fig. 21 is a vertical section taken on line 21—21 of Fig. 15 to show the manner of support for both the spindle and turntable, and;

Fig. 22 is a horizontal section taken on line 22—22 of Fig. 21.

In the drawing, wherein for the purpose of illustration, is shown one embodiment of the invention, the reference character 2 is used to denote a housing for the record changer while also included in the record changer is a turntable 3, to support records *r* so that they may be effectively engaged by a pickup arm 4. The turntable is driven constantly by a motor 6 through an idler pulley 7, pressed by resilient means, not shown, against the interior of the turntable and a pulley 8 on the motor 6. Also included in the construction of the record changer are record dispensing means which comprises a spindle 9, centrally of the turntable, and an ejector head 11, supported substantially above the pickup arm to one side of the turntable. The spindle is adapted to extend through the center holes of a group of records R and to afford support for the group adjacent their center holes by a shoulder 12 on the spindle, the exact construction of the spindle being disclosed in the copending application of Willard J. Faulkner, Serial No. 493,242, now U. S. Patent No. 2,498,333. The ejector head engages records of the stack R, at their peripheries, by providing support thereat and clamp means, later to be described, to press the records against the support. From the support of the head 11 and shoulder 12 the records are dislodged one-at-a-time by an ejector plate 13 (Figs. 3 and 4) which is adapted to be oscillated indirectly from the motor 6 by means which include a movable frame 14 (Fig. 1) in slidable association with a stationary frame 16, both of which will be described hereinafter. After the records are released from the shoulder, they are guided downwardly to the turntable by the spindle where they accumulate, and from whence they must be manually removed and again placed in inverted position on the spindle before the remaining side of each record may be played.

Figures 6, 7, 8:
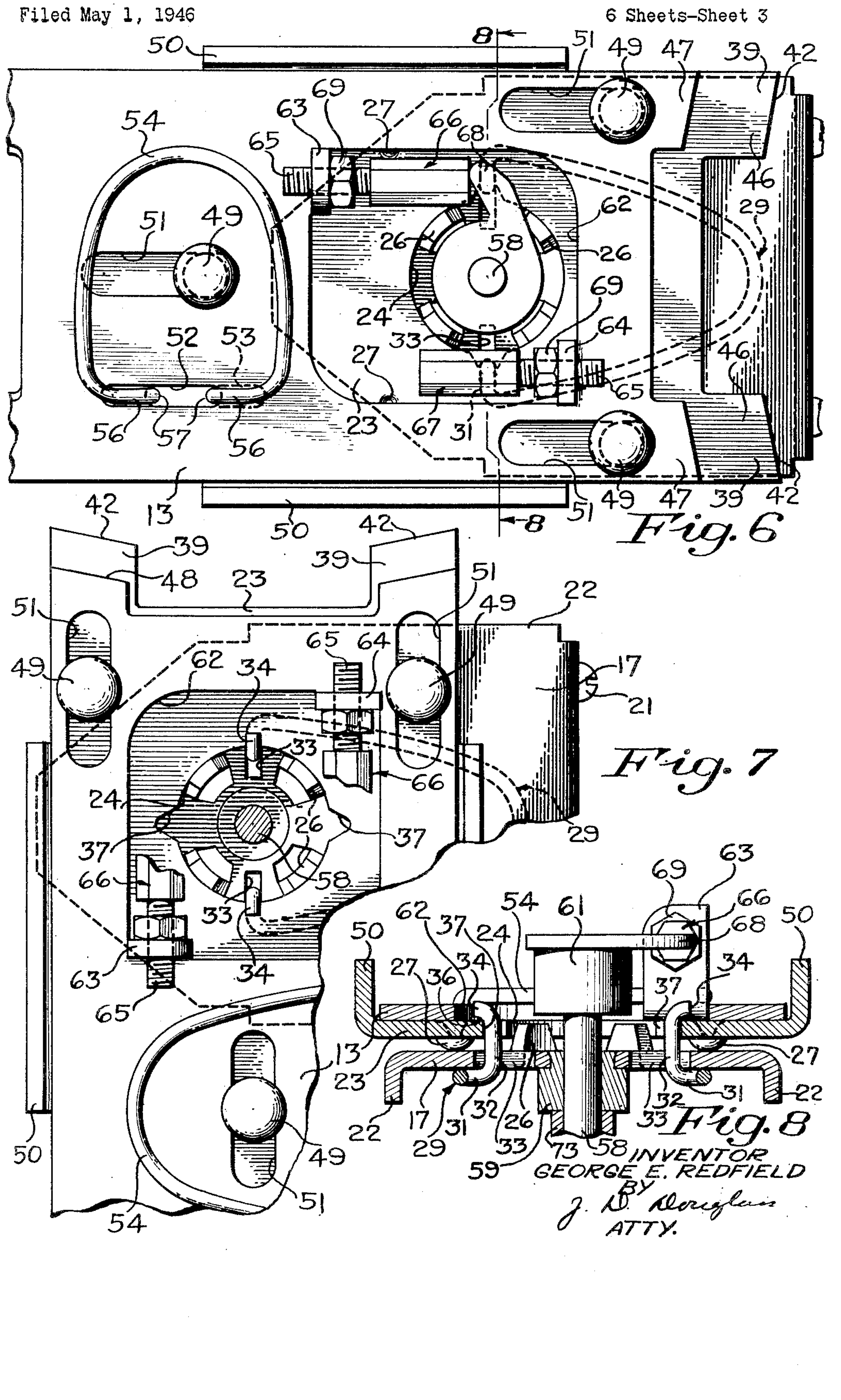
Fig. 6 is another plan view showing elements of the ejector head with the ejector plate in record ejecting position, the head being drawn to a scale approximately twice actual size and a portion thereof being broken away.
Fig. 7 is a fragmentary view of the ejector head, in plan, showing the rotary plate and ejector plates while in the operation of being swung from a 10-inch record engaging position to a 12-inch record engaging position, the crank arm and hub thereof having been removed to reveal the trunnion members and means for maintaining the plates in engagement with each other.
Fig. 8 is a vertical section taken on line 8—8 of Fig. 6.

The ejector head 11 provides support, at the edges thereof, for both 10 inch and 12 inch records, since it is mounted eccentrically of its vertical axis. In order that the ejector head may possess this capacity, I provide a bearing plate or supported plate 17, preferably struck from sheet metal. The plate 17 is provided, at one end thereof, with a downwardly extending flange 18 which is attached to a vertical column 19 by screws 21, the column being an extension of the frame 16. Laterally thereof the plate 17 has downwardly extending flanges 22, to add rigidity to the plate in its function as bracket and bearing. The flange can best be noted in Figs. 3 and 5. Pivoted on the plate 17 is a rotatable plate 23 which is preferably of sheet metal having an aperture 24 therethrough (Figs. 6, 7 and 8). The edge of the aperture 24 is of circular conformation to provide a bearing surface for a plurality of trunnion members 26, preferably struck from the plate 17 and adapted to extend into the aperture 24. The plates 17 and 23 are spaced from each other by feet or projections 27 provided by deforming the plate 23. In addition, a similar projector 28 on the plate 17 adds to the spacing and, like the projections 27, provides bearing support for the plate 23 and load transferred thereby.

Novel means are employed to clamp the rotatable plate 23 to the supported plate 17. It involves use of a spring 29, of arcuate structure, which is held in a state of deflection due to the manner in which its respective ends are anchored within the limits of the aperture 24 (Figs. 6, 7 and 8). The respective end portions of the spring are bent to provide shoulder portions 31, which extend toward each other. The shoulder portions are additionally bent to provide lateral portions 32, which extend through slots 33 in the plate 17 and aperture 24 in the rotatable plate 23. Nearer their extremities the end portions of the spring are again bent to provide hook portions 34, extending over the top of plate 23 and pointing away from each other. Inasmuch as the shoulder portions 31 are in abutment with the lower side of plate 17, and the hook portions 34 in close proximity to the top of plate 23 said plates are thus clamped in intimate association with each other. Desirably, there may be a slight radius 36 on each of the end portions of the spring adjacent the hooked portions. The radii 36 then bearing against the upper edge of the aperture 24 provides cam action therewith to draw plates 17 and 23 together as the tendency of the spring to straighten exerts force against the wall of the aperture.

It will now be apparent that the plates 17 and 23 may be operatively associated with each other by first inserting the trunnion members 26 into the apertures 24, then having pinched the ends of the spring together sufficiently, the ends are inserted through the slots 33 into the position they occupy in Fig. 8. It will also be apparent that corresponding ease of disassembly is provided since pinching the ends of the spring slightly permits the same to be withdrawn whereupon plates 23 may be readily removed from the trunnion members 26. Although the assembly and disassembly is quickly and easily effected, the spring is effective at all times and holds the parts together without a tendency to accidental displacement.

The opposite ends of the plate 23 respectively provide support for 10-inch and 12-inch records. The plate 23 is of rectangular conformation and has, at one end thereof, a pair of fingers 38, (Fig. 4) while at its opposite end, the plate has a pair of fingers 39. The fingers preferably terminate in slanting extremities 41 and 42 substantially tangential to the respective peripheries of the sized records the fingers are adapted to support. As best observable in Fig. 4, the fingers 38 are adapted to afford support for 10-inch records since they are farther from the axis of the trunnion members 26, and consequently nearer to the spindle 9, than the fingers 39 which are adapted to support 12-inch records. Superimposed on the rotary plate 23 is the ejector plate 13, which is slidably anchored to the plate 23 and of thickness substantially less than the thickness of a record. The ejector plate is of generally rectangular conformation and substantially shorter than the rotatable plate 23. The plate 13 is normally held centrally of the rotary plate by resilient means later to be described, thereby normally providing uncovered surfaces or record seats 44 on the fingers 38 and uncovered surfaces or seats 46 on the fingers 39. If desired the ends of the ejector plate may be recessed to thus provide fingers 47 at the corners thereof which may include extremities 48, in substantially parallel relationship to the slanting extremities 41 of fingers 38 and extremities 42 of fingers 39.

Figures 1, 3, 4, 5:
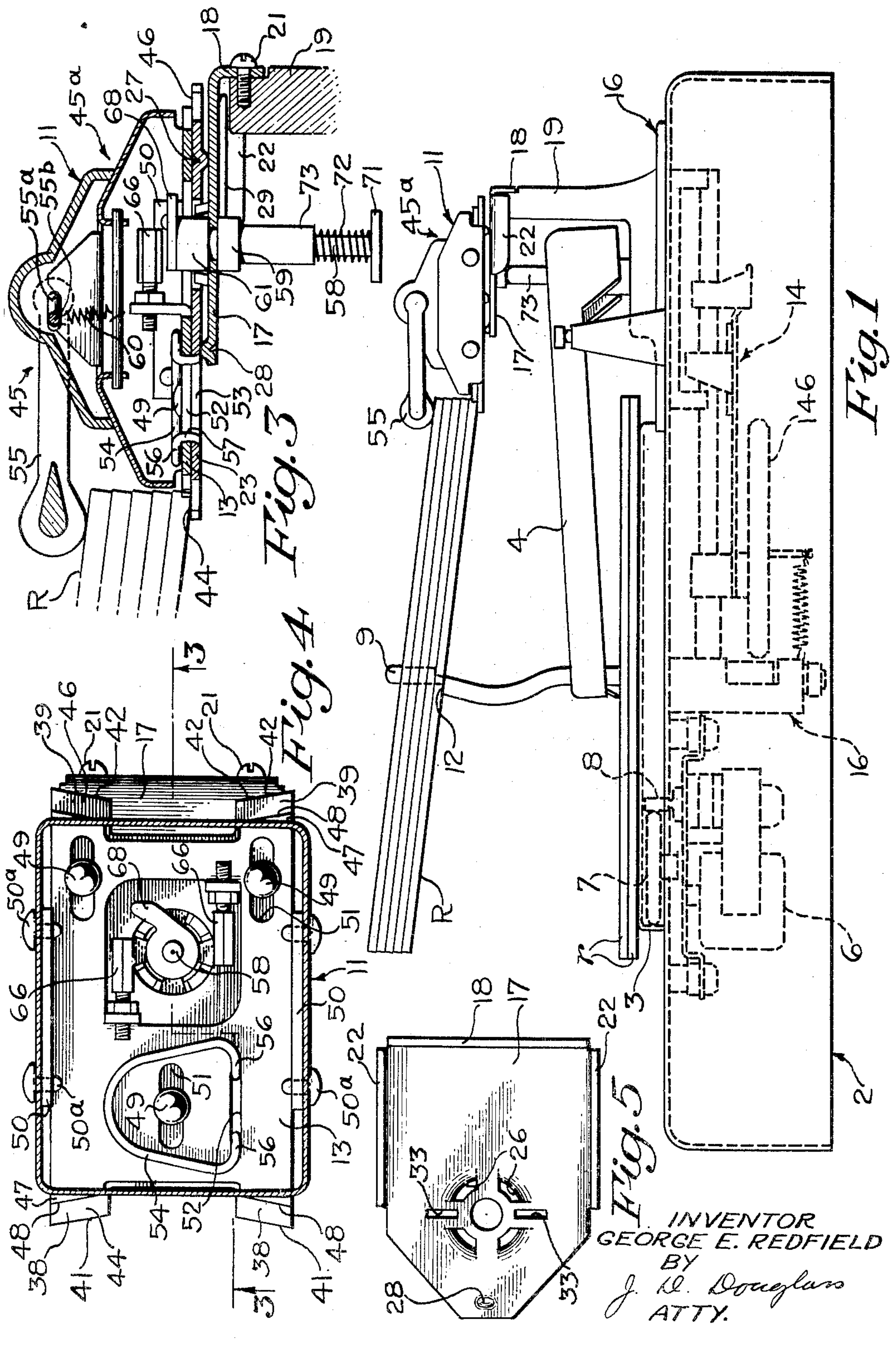
Fig. 1 is a view of a record player, in elevation, to illustrate a preferred embodiment of the present invention.
Fig. 3 is a sectional view of the ejector head taken substantially on line 3—3 of Fig. 4, the scale of the view being approximately actual size.
Fig. 4 is a plan view of the ejector head, the cover thereof being broken away to disclose the mechanism normally hidden by the cover.
Fig. 5 is a bottom plan view of the bearing plate of the ejector head.
Figure 2:
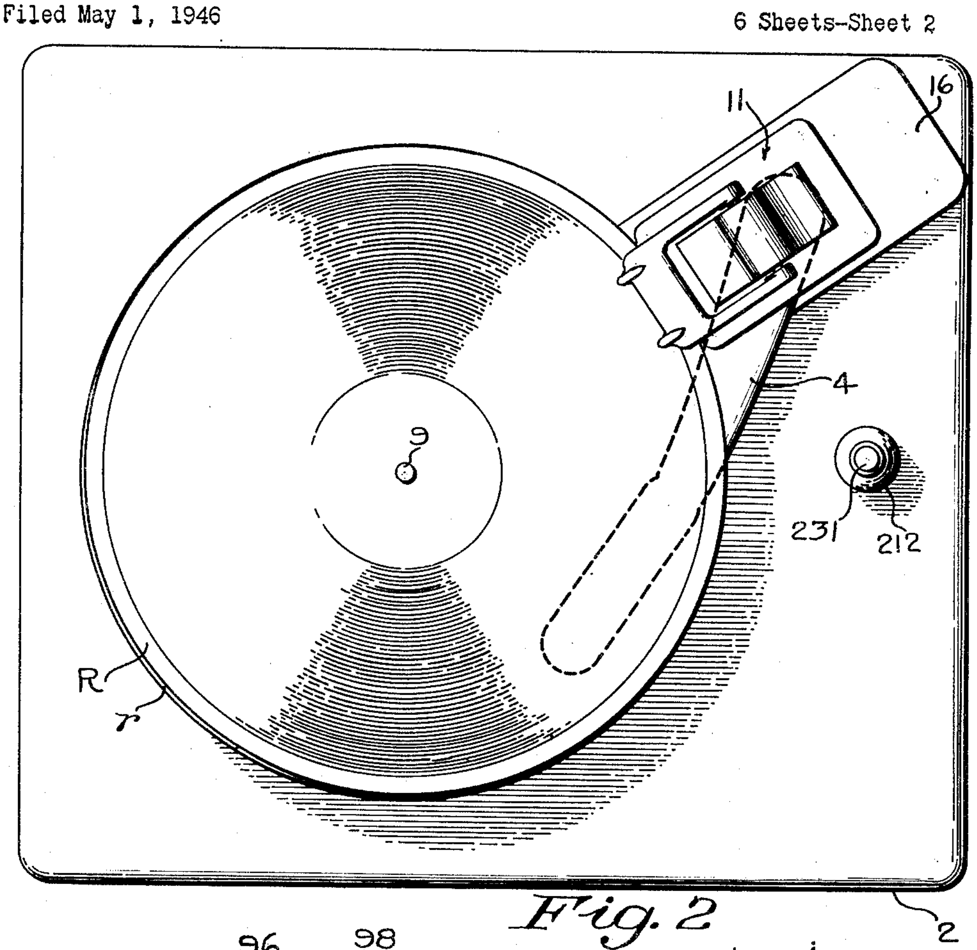
Fig. 2 is a plan view of the record player of Fig. 1.

Means to effectively anchor the ejector plate in a position centrally of the rotatable plate 23 includes headed studs 49. The studs are mounted on the rotary plate 23, and extend through guide slots 51 in the ejector plate 13. Additionally the plate 13 is provided with a slot 52 which is similar to a slot 53 in the plate 23 (Figs. 3 and 4). In the position indicated, the slot 52 is in registration with the slot 53. This status is maintained by an arcuate spring 54 having arm portions 56 extending toward each other and in intimate association with the ejector plate 13. The arm portions are further bent so as to include anchor portions 57 extending through the slot 52 and into the slot 53. If desired, the extremities of the anchor portions 57 may be bent away from each other slightly as shown (Fig. 11) so that slot 53 provides adequate retention for the spring to prevent displacement therefrom.

For maintaining engagement of the ejector head 11 with records of the stack R the head includes a clamp 45. It comprises a composite cover 45$a$, attached to upstanding flanges 50 on either side of the plate 23 by removable headed pins 50$a$. Additionally the clamp includes a yoke 55, rigidly mounted on a rock shaft 55$a$ having a central crank section 55$b$, to which biasing force of a spring 60 is applied urging the yoke to assume a position on either side of the shaft, and, as in Fig. 3 position, to press the stack of records against the seat 44. Since the bottommost record rests on the shoulder 12 and is adjacent one of the extremities 48, it will be apparent that as the ejector plate 13 is slid longitudinally of the rotary plate, so that the extremities 48 coincide with the extremities 41, that the bottommost record is pushed from the support of the seats 44, and simultaneously from the shoulder 12 so that the record drops to the turntable 3. The ejector plate in this position is indicated in Figs. 6 and 11, together with crank means for moving the ejector plate against the resistance of spring 54.

In detail the crank means include a shaft 58 (Fig. 11) which is journaled in axially slidable relationship to a boss 59 on the plate 17. The shaft is mounted in concentric relationship to the trunnion members 26 so that a crank hub 61, pinned to the upper end of shaft 58, may pass within the trunnion members and normally rest against the plate 17. In order to provide for longitudinal motion for the ejector plate said plate is provided with a substantially rectangular aperture 62 (Fig. 6). Additionally, arms 63 and 64 at opposite corners of the aperture 62 are preferably struck from the ejector plate 13, to provide supports for adjustable abutments 66 and 67. The abutments preferably comprise bolts 65, threaded in the arms 63 and 64 at such a height from the plate 13 that a crank arm 68, rigidly attached to the hub is free to pass under either of the abutments 66 or 67, when the hub 61 is resting against the plate 17. If desired, jam nuts 69 may be employed to lock the abutment members in positions found by test to be suitable for effective operation of the ejector plate.

Provision is made to enable the ejector head to be turned through a half turn or more without the abutment members 66 and 67 interfering with crank arm 68. This is effected by normally maintaining the crank arm in a plane below the level of the abutment members so that they may pass over the crank arm as the head is changed from a 10-inch record adjustment to a 12-inch record adjustment, or vice versa as the case may be. The hub 61 is therefore biased against the plate 17 by means which include a compression spring 72, the lower end of which presses against a mobile plate 71, rigidly mounted on the lower end of shaft 58. Pressure of the spring 72 in a direction away from the mobile plate is against a sleeve or spacer 73, on shaft 58, abutting the hub 59.

In order that the crank 68 may engage either of the abutments, said crank must therefore be lifted against the force of spring 72. This is accomplished by a lift rod 74, (Fig. 11) adapted to engage the mobile plate 71, and a lift cam or plate 76 which the lift rod is adapted to engage. The lift rod is slidably mounted in a tubular shaft 75, which shaft is, in turn, journaled in the stationary frame 16. The cam 76, on the other hand, is a member of the movable frame 14. Normally, and simultaneously with playing of a record, the rod 74 rests against a dwell 77 on the cam 76. When, however, a reject impulse is delivered to mechanism, later to be described, to reject a record the movable frame moves to the right as it is indicated in Fig. 11. In its movement, the cam 76 is guided in its course by horizontal guide bars 78 and 79, (but one of which is shown) coupled to the cam by a cross-head 80. As the cam moves to the right, the lift rod is raised as it passes up on inclined plane 81 of the cam 76, and then comes to rest on an elevated horizontal portion 82 of the cam 76. During this operation, the lift rod engages the mobile plate 71 which it moves upwardly against the resistance of spring 72. At the same time the upward motion is imparted to the crank arm 68, coupled to the mobile plate, so that the arm 68 is thereby brought into the plane of the abutment members 66 and 67 as indicated. The crank 68 is then swung into engagement with one of the striker members from its position centrally of the rotatable plate (Fig. 4) to a record releasing position to be noted in Fig. 6. Means to rotate the crank arm 68 will be described hereinafter.

Figures 9, 10:
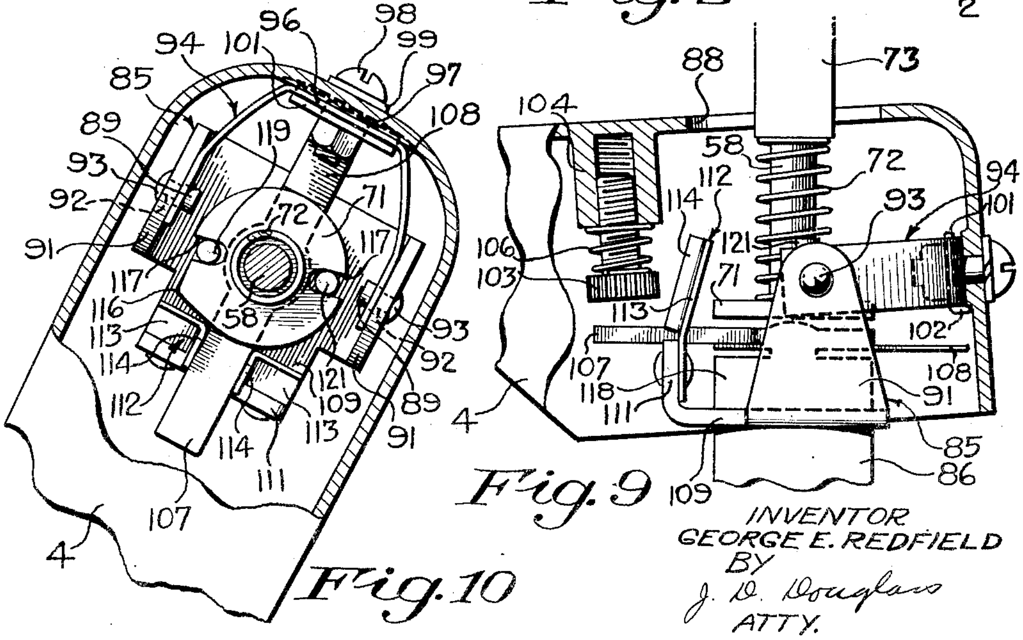
Fig. 9 is a fragmentary view, in side elevation, showing the pickup arm in record-engaging position, a portion of the arm being broken away to reveal the structure of mechanism to support the pickup arm.
Fig. 10 is a plan view of the parts shown in Fig. 9 the upper part of the pickup arm being broken away to reveal the structure of the supporting members of the pickup arm.

It is desirable that the pickup arm be supported in such a way that it does not quiver when lifted out of engagement with a record or brought into engagement with a record. Partly with the object in mind of overcoming this disadvantage, I provide a pickup arm carrier or spider 85 (Fig. 11) having a hub 86 on the base thereof. The spider is rotatably mounted on the tubular shaft 75 adjacent to, but separated from, the stationary housing 16 by a bearing washer 87. The pickup arm, generally old in the phonograph art, is provided with an elongated aperture 88 in the top thereof, to accommodate the sleeve 73, so that the pickup arm may be rocked about pivots 89 on a pair of upturned ears 91 on the spider 85. The pivots may comprise studs having sections 92 (Fig. 10), of reduced diameter, extending through the ears 91 and having their outward extremities upset to provide rivet heads 93 for securing them in rigid relationship to the spider. Additionally, the ears embrace the ends of an arcuate member 94, through which the studs extend. The arcuate member 94 has a central straight portion 96, adapted to be clamped in abutment with a flat pad 97, on the pickup arm, by a bolt 98. In its clamping operation the bolt 98 is assisted by a lockwasher 99 and an alignment plate 101. The plate 101 has a flange 102 on its lower edge which extends under and in intimate association with the straight portion 96 and pad 97, to hold the arcuate member against forces tending to rotate it about the bolt 98. It will, therefore, be apparent that while playing a record, one end of the pickup arm is supported by the record while the remainder of the pickup arm is supported by the pivots 89.

When the pickup arm is disengaged from a record, novel support is additionally employed to sustain the arm. The support includes an adjustment screw 103 (Figs. 9 and 11) threaded in a boss 104 within the top of the pickup arm 4. Additionally, a lock spring 106 serves to resist change of position to which the screw 103 has been adjusted. The upper end of the rod 74 carries a rigid arm 107 extending under the screw 103. Also mounted on the rod 74 is a resilient arm or leaf spring 108, which extends under the flange 102. When the pickup arm is in engagement with a record as in Figs. 1 and 9, the arm 107 is spaced from the screw 103, and the spring 108 is spaced from the flange 102. When, however, the lift rod is raised by the cam 76, the rigid arm 107 engages the screw 103 and thereby rocks the pickup arm about the pivots 89, from the position indicated in Fig. 9 to the position shown in Fig. 11. At the same time the spring 108 is carried upwardly into engagement with the flange 102 which, being swung downwardly, deflects the leaf spring. The resistance of the spring to deflection thus steadies the pickup arm as it is cantilevered from its supports above the level of the turntable.

Since the lift rod 74 is rotatable within the tubular shaft 75, it is necessary to provide means to guide the arm 107 to and from engagement with the screw 103. Therefore, the spider includes an extension 109 which has, toward the end thereof, upturned ears 111 to which is riveted, or otherwise rigidly secured, a resilient, bifurcated member or guide 112. The guide 112 may be appropriately struck from some thin, resilient sheet metal and comprises arms 113 having outwardly extending fins 114, in intimate slidable association with the arm 107.

Novel mechanism is employed for coupling the pickup arm 4 to the tubular or rock shaft 75. It provides means by which the pickup arm can swing freely through a predetermined arc, horizontally of a record on the turntable, and then the arc having been passed through by the pickup arm, reject mechanism is actuated from the arm in response to which said arm is removed from engagement with the record. Then the pickup arm becomes tightly coupled to both the rock shaft and the ejector head, the ejector plate 13 of which is operated, after the pickup arm has been swung out from beneath the stack of records R. As a safety measure, the foregoing mechanism provides means to avoid breakage or maladjustment of parts otherwise subject to the operation of inexperienced or careless persons. For example, the pickup arm may be forcibly moved laterally from the position it occupies while in raised position, without damage or misadjustment to any of the parts of the record changer.

As will be apparent, on observing Fig. 12, the mobile plate 71 has an ear portion 116, adapted to have engagement with the bifurcated member 112. The mobile plate is also provided with diametrically opposite notches 117, in the periphery of the plate 71. Below the arm 107 (Figs. 9 and 11) a collar 118, pinned to the upper end of sleeve 75, bears a pair of upwardly extending pins 119 and 121, in slidable engagement with the notches 117. Since the arm 107 extends between the pins 119 and 121, the arm may swing, through an arc of substantial extent, relative to the shaft 75. It therefore follows that the pickup arm may swing through an arc relative to shaft 75 as defined by the sides of the pins, lost motion thus being provided between the pickup arm and shaft 75. Assuming that the free end of the pickup arm has been lowered into engagement with a record, toward the periphery thereof, it is so brought into engagement while the pins 119 and 121 are in engagement with the arm 107. With the exception of a condition at times created through the medium of a trigger mechanism, later to be described, the arm 107 so remains in engagement with the pins 119 and 121, from the point where initial engagement is established to the time at which the pickup arm reaches the run out groove. During this period, the shaft 75 turns with the pickup arm until mechanism, later to be described, for rejecting the record, is actuated from the shaft 75. Also during this period; that is, the period during which the pickup arm is carried across the record by the convolutions of the sound groove thereon the mobile plate 71 is in a downward position and is rotated without interference with the bifurcated member 112. Additionally, the lift rod 74 (Fig. 11) rests on the dwell 77 of cam 76.

As the particular mechanism which is adapted to reject the record is actuated the cam 76 moves from left to right and in so doing raises the lift rod to the elevated horizontal surface 82 of the cam. Accompanying this operation the arm 107 engages the screw 103 lifting the pickup arm from engagement with the record being played. Simultaneously the mobile plate 71 is raised to the elevated position indicated. But the arms 113 of the guide 112 extend backward toward the shaft 58 and the free ends of the arms extend over the arc that the ear 116 is adapted to be carried through. Therefore, it will be apparent that as the mobile plate is lifted from the position it occupies in Fig. 9 to the position it occupies in Fig. 11 that the ear 116 is lodged between the arms 113. When the arms and ear are in this relationship, the mobile plate 71 is drivingly coupled to the shaft 75 through the spider 85, also the mobile plate 71 is drivingly coupled to the pickup arm. Should the pickup arm 4 be grasped during the process of rejecting a record, however, and forcibly moved from the position that the pickup arm occupies there will be no fracture or misalignment of parts since the cam action between the sides of the ear 116 and the arms 113 presses the arms away from the plate 71, thereby allowing the ear to be moved from between the arms, or out from between the arms and back to the former position between the arms again. Thus I provide frictional means to assist in conveying the pickup arm away from a record, after it has been rejected, and into initial contact with the next record, after it has been released from the stack R. In its arc of rotation, above a record, the pickup arm may be manually swung through an arc limited only by the spindle 9 and a pin 122, mounted on the stationary frame 16.

Whether the record player is in readiness for playing a record, rejecting a record or releasing a record from the stack R to replace a rejected record, depends on the position of a bell-crank lever 123. The lever 123 is rigidly mounted on the lower end of the shaft 75 and is adapted to be acted upon by means including elements of the movable frame 14. Additionally, one arm of the lever 123 is offset at 124, so that it may perform the function of a link in a latch mechanism, to be described hereinafter.

The means for actuating the lever 123 will now be described. It includes the stationary frame 16 which comprises a sub-frame 126, coupled to a turntable frame 127 by the rods 78 and 79. The sub-frame may be of die cast metal and of generally rectangular conformation, and having edges which extend over the top of the housing 2, to which the sub-frame may be conveniently attached. On its lower side are downwardly extending lugs 131 having grooves or stirrups 132 at the extremities thereof, adapted to have clamped there against the rods 78 and 79 by screws 133 which extend upwardly through the rods and are threaded in the lugs 131. The lugs thus provide means for spacing the rods 78 and 79 and sustaining them in horizontal parallel relationship to each other. Upwardly thereof, the sub-frame includes a pad 134, which is surmounted by the column 19. The rods 78 and 79 extend through the turntable frame 127, to which they are rigidly pinned. The frame 127 may also be of die-cast metal and includes upwardly and outwardly extending arms 136 and 137 (Fig. 21), by which the frame 16 is adaptable of attachment with the housing 2, in any suitable manner. Other details of construction embodied in the turntable frame will be described hereinafter.

As previously indicated, the stationary frame 16 provides support for the tubular shaft 75, assisted by a boss 138 on the sub-frame 126. Additionally, the frame 16 provides support for the turntable 3, while the movable frame 14 is adapted to slide along the rods 78 and 79 to which it is coupled.

In detail the movable frame 14 comprises the master plate 76, preferably of sheet metal and of generally rectangular conformation, as will be evident from Fig. 17. At the right hand end thereof the plate 76 is offset to provide the cam dwell 77, previously referred to. At this end (Fig. 11) the sides of the plate 76 are embraced by the U-shaped yoke or cross-head 80, to which the dwell portion 77 is conveniently and rigidly secured. The respective ends of the yoke 80 have bearing portions 142 (Fig. 19) to embrace, in slidable relationship, the rods 78 and 79. Above the opposite end (Figs. 14 and 15) of the plate 76; that is, the left hand end the rods extend through a cross-head 143, also in slidable relationship to the rods, and rigidly secured to the plate 76 in a convenient manner.

It is desirable that resilient or cushioned means be employed for moving the frame 14 along the rods 78 and 79. Therefore, a compression spring 144 is coiled about the rod 79 between the cross-head 143 and the lug 131, to normally maintain the frame 14 in the position indicated. To limit the consequent leftward expansion of the spring 144 one of the rods carries a sleeve 145 therearound, the ends of which are adapted to abut the frame 127 and cross-head 143. To move the frame 14 from left to right a rubber-crowned, eccentrically mounted pulley 146 is utilized. It comprises a pair of discs 147 and 148, struck from sheet metal, and rigidly attached to each other in any convenient manner. At their peripheries the discs have spaced apart flanges 149, to accommodate a rubber ring 151 therebetween. Eccentrically of the axis of the pulley is a hub 152, adapted to receive in bearing relationship therewithin a stud 153, extending downwardly from the cross-head 143 through the plate 76. At the discs the hub 151 is of reduced cross-section thereby providing a shoulder 154 against which the discs are clamped by an upset portion 156 of the hub. The pulley 146 is held on the stud by a washer 157 and a screw 158 passing through the washer and threaded in the stud 153. It will therefore be apparent that the pulley 146 including its hub 152 are rotatable on the stud between the washer 157 and plate 76.

The rubber crowned pulley 146 is adapted to engage a knurled or friction pulley 159, driven with the turntable 3. The pulley 146 is urged to rotate, clockwise, from the dead center position of Fig. 16 by a tension spring 161 one end of which is anchored to the turntable frame while the remaining end is anchored to a pin 162, carried by the wheel 146. However, during playing of a record the wheel 146 must not be allowed to engage the pulley 159. Therefore, latch means is provided to overcome the force of spring 161 so that the wheel 146 may be thereby held in spaced relationship to the pulley 159 as indicated in Figs. 14, 15 and 16.

In brief, the latch means just referred to involves use of a lug 163 on the wheel 146 and a mobile stop member or stop 164 adapted to arrest rotation of the wheel by its intermittent presence in the orbit that the lug 163 is carried through. In greater detail, the plate 76 includes, longitudinally thereof, a slot 166, of width substantially less than the diameter of the stop 164. In turn, the periphery of the stop 164 is provided with a groove 167 in which are slidably received the edges of the plate defining the slot 166, to restrain the stop from axial displacement and provide means for guiding it to and from the orbit of the lug 163. For this oscillatory movement the stop 164 is pivoted on one end of a link 168 and the other end of the link is pinned to one end of the bell crank lever 123.

Means are also provided to vary the position of the lug 163 diametrically of the pulley with the object of varying the point at which the record changer will reject a record. With this end in view the lug 163 preferably forms an integral part of a substantially rectangular adjustment plate 169 in slidable association with the disc 147. The plate 169 is adapted to slide in a predetermined course governed by means including ears 171 (Fig. 14). Additionally, the plate 169 includes an ear 172, extending downwardly through an elongated aperture 173 in the disc 147 and an elongated aperture 174 in the disc 148. At either end of the aperture 174 are ears 176 and 177, struck from the disc 148. An adjustment screw 178, although threaded in the ear 172, is journaled in the ears 176 and 177 which merely anchor the plate 169 in place between the ears 171 and hold the lug 163 perpendicular to the disc 147. Adjustment of the plate 169 to the right (Figs. 15 and 16) is, of course, effected by the screw 178, against the resistance of a compression spring 179 coiled about the screw, while releasing the clamping action of the screw permits the spring to elongate thereby pushing the plate 169 to the left.

Assuming that a record is being played while the members of the player mechanism are in the positions indicated in Figs. 14, 15 and 16, the lug 163 rests against the stop 164. Also as the playing process continues the pickup arm rotates clockwise carrying with it the bell crank lever 123, (Fig. 14) also in clockwise direction. As the pickup arm reaches the run out groove the stop 164 is moved out of the orbit of the lug 163, thereby enabling the spring 161 to swing the wheel 146 into engagement with the pulley 159. Thus the wheel 146 becomes drivingly associated with the pulley 159, a condition which is augmented by a knurled or otherwise roughened surface on the pulley 159. As the wheel 146 is thus rotated, clockwise (Fig. 16) it moves the movable frame to its extreme position at the right (Fig. 17), the motion being against the resistance of spring 144 (Fig. 15). At the same time the bell-crank lever 123 is engaged by a lug 181, on the plate 76, and by which the lever is swung to the position indicated. Additionally the consequent rotation of shaft 75 (Fig. 11) is communicated to the crank arm 68 (Fig. 6) which moves the ejector plate 43 to the left, as indicated, against the resistance of spring 54. As the wheel 146 continues its rotation thereby returning the lug 181 to the position indicated in Fig. 16, the spring 54 (Fig. 6) returns the ejector plate to its position centrally of the rotary plate which motion is communicated to the bell-crank lever 123 to swing it back to the position indicated in Figs. 14 and 16, and wherein the stop 164 is in position to intercept the travel of the lug 163. Approximately simultaneous with this interception of the lug 163 the pickup arm is lowered into initial engagement with a replacement record. Thus the operation of automatically playing a record, rejecting it and then replacing the played record by an unplayed record is repeated.

A safety feature is provided as a safeguard against bending or breakage of any of the parts of the record player should the pickup arm be carelessly or inadvertently retarded in its travel from a point toward the center of the turntable to a position beside the turntable; for example, should a child grasp the pickup arm and retard its motion between the time when a record has been rejected and before it has been replaced by the succeeding record. The foregoing safety feature involves use of the lug 181 which is movable relative to the plate 76. The lug is so associated with the plate 76 by means of a slide member 183, of which it is an integral part. The slide member is of rectangular formation and has a longitudinally extending slot 184 therein, adapted to receive anchor-studs 185, on the plate 76, so that the slide member may be slidably coupled thereto. Additionally, the slide member 183 is resiliently anchored in the position indicated (Fig. 15) by a tension spring 186 one end of which is attached to the U-shaped member 80 while its remaining end is secured to the slide member 183 at one corner thereof. As will be noted, (Fig. 16) the corner of the member 183, to which the spring is attached, overlies a recess 187, in the side of the plate 76, to avoid interference between the spring and said plate. Owing to this construction the plate 76 moves ahead of the lug 181 should the lever 123 obstruct the left-to-right movement due to such reasons as already indicated. The spring 186, of course, returns the lug to its Fig. 15 position as the frame 14 returns to the left.

Mechanism is also provided to reject a record at any point during playing of the same. This is accomplished by rocking the lever 123 to the position it occupies in Fig. 20 from another position, such as the one occupied by the lever in Fig. 16. In this operation the wheel 146 is permitted to rotate into driving engagement with the pulley 159, since the stop 164 is also withdrawn from engagement by the lug 163. The force necessary to swing the lever 123, as just indicated, is due to spring pressure, normally resisted by a trigger mechanism 188 (Figs. 14 and 20).

The trigger mechanism comprises a slide plate or slider 191 in slidable association with a bracket 192, of substantially L-shaped formation. This bracket, which is preferably struck from sheet metal, includes a limb 193 providing a guide portion for the slider 191 and a limb 194 which is offset at 195 from the limb 193 (Fig. 15) so that by means of feet 196, extending laterally of the offset portion, the screws 133 may clamp the guide portion 193 in intimate association with the lower side of the frame 16. Additionally the limb 193 has a downwardly-bent lug 197, which may be in abutment with the rod 79 for the sake of additional support for the bracket 192. Additionally the limb 193 has, extending longitudinally thereof, a slot 198, adapted to receive headed studs 199 on the slider 191 so that said slider is thereby slidably anchored to the limb 193.

Although the slider 191 is constantly urged, by spring pressure, to move to the position shown in Fig. 20, from the position shown in Fig. 16 it is restrained from so doing by hook means on the limb 193. The leftward urge is imparted to the slider by a tension spring 201 in extension between an ear 202, on the limb 193, and an ear 203, on the slider 191. The hook means is adapted to normally overcome the force of spring 201 and includes a lever 204, pivoted to the limb 193 at 206. It has an end portion providing a cam 207 and a hook portion 208, adapted to establish holding engagement with a finger 209, extending downwardly from one end of the slider 191. Additionally, the holding engagement is augmented by a coil spring 211, in tension between the lever 204 and bracket 192, the spring serving to bias the lever clockwise against the finger 209. It will, therefore, be apparent that immediately the lever 204 is rocked counterclockwise, against the resistance of spring 211, the hook 208 releases its grasp on the finger 209 whereupon the spring 201 draws the slider quickly to the left (Fig. 20). In so moving, the finger 209 strikes the lever 123 which is rocked counterclockwise thereby to the position shown. Since simultaneously with rocking of the lever 123, the stop 164 is withdrawn from engagement with the lug 163 the wheel 146 is rotated into driving engagement with the pulley 159. Consequently, the movable frame 14 starts moving to the right, accompanied by removal of the pickup arm from operative engagement with whatever record that is on the turntable 3. In other words, the record on the turntable is thus rejected. In this manner of rejecting, the pins 119 and 121 are carried away from arm 107 (Fig. 10), since they are rigidly coupled to the lever 123.

But the force necessary to rock the lever 204 about its pivot 206 is conveyed from a trip mechanism above the housing 2. This mechanism, best shown in Fig. 19, provides versatile means for rocking the lever 204 since the trip mechanism may be mounted in a variety of positions on the housing. This is due to its inherent construction and the novel manner by which it is coupled to the lever 204. In detail, the trip mechanism comprises a pedestal 212, above, and a bracket 213, below, the horizontal wall of the housing 2, to which the pedestal and bracket are clamped by screws 214, but one of which is shown. Laterally of the axis of the pedestal the bracket 213 carries a downwardly extending lug 216, on which is pivoted a trip lever 217 by a rivet 218, the lever being preferably struck from sheet metal. The lever 218 includes a long arm 219 and a short arm 221, bent perpendicular to the surface of the long arm 219 and extending laterally across the axis of the pedestal 212. Additionally, the trip lever 217 is urged in clockwise direction by a coil spring 222, in tension between an ear 223, preferably struck downwardly from the bracket on one side of the axis of pedestal 212, and the long arm 219, on the opposite side of the pedestal axis. The pedestal is provided with a bore 224, in which is slidably mounted a shaft 226 which is in engagement with the arm 221. The lower portion of the pedestal is counterbored at 227 to accommodate a washer 228 on shaft 226 and nut 229, threaded on said shaft to limit the upward displacement of the rod, while a button or head 231, upwardly of the shaft, limits the downward displacement of the shaft. The function of the latter limiting factor is illustrated in Fig. 19 wherein the shaft is pressed downwardly, against the resistance of the spring 222. In this operation the rocking motion of the lever 217 imparts rocking motion to the lever 204 (Figs. 19 and 20) by some flexible member such as a cord or wire 232. An advantage of the member 232 is, of course, that it can be readily cut to conform to the particular position it is desired to install the trip mechanism in, the position being in accordance with the style or size of housing the trip mechanism is to be used on.

Although the lever 204 is rocked clockwise from the position it occupies in Fig. 20 as soon as downward pressure is relieved from the head 231, the slider 191 remains in the position shown until moved therefrom by the carriage 14 as it travels from left to right. This is occasioned by engagement of the lug 181 with an ear 233, extending downwardly from the slider 191, and adapted to clear the lever 123. In the meantime the clockwise motion of lever 204 is arrested by the adjacent lug 131 so that the cam 207 is thus held in position to be engaged by the finger 209 as it is carried to the right, against the force of spring 201. As the advancing lug 181 moves the slider 191 to the right the finger 209 engages cam 207 over which it rides and depresses the cam by swinging it counter-clockwise until the spring 211 snaps the hook 208 behind the finger 209. The slider's motion to the right is discontinued at a point just after the hook 208 reaches a point to the rear of the finger so that as the movable frame 14 moves leftward the hook establishes holding engagement with the finger 209.

Also at the same time that the slider is being returned to its normal position, from the Fig. 20 position, the lug 181 engages the lever 123 which is swung clockwise to the Fig. 17 position as the movable frame is advanced to its position at the extreme right. Then, as previously indicated, the lever 123 is swung counter-clockwise by the spring 54 (Fig. 4) to the position the lever occupies in Fig. 16 wherein the stop 164 is in rediness to intercept the lug 163, the position occupied by these elements when a record is being played. As the lug 181 is carried to the right the cam 76 raises the ear 116 (Fig. 10) into engagement with the adjacent arm 113 which is thus pressed outwardly until ensuing rotation of the mobile plate 71, counter-clockwise, enables the ear 116 to lodge between the arms 113, as previously indicated.

Novel features have been incorporated in the means of support for both the turntable and the spindle. Of particular interest is the manner in which they are associated, by supports which are independent of each other. This is with the aim of segregating any possible imperfection or maladjustment of one of these members so that ill performances resulting from the imperfections or maladjustment will not be communicated to the other of these members as in machines of prior construction. Figs. 21 and 22 indicate the means employed to obviate these difficulties. As will be noted, the turntable 3 has a tubular shaft 236, extending downwardly therefrom which is rigidly mounted centrally of a hub 237, on the turntable. The turntable frame 127 includes vertical side walls 238 and 239, in addition to the upward extensions 136 and 137 of which terminate in horizontally extending feet 243 and 244, by which the frame 16 is, in part, bolted to the housing 2.

The side walls 238 and 239 are joined to each other, at their bases, by a horizontal base wall 246 and by a horizontal web 247, adjacent the junction of rods 78 and 79 with the frame 127. From the lower side of web 247 a boss 248 extends downwardly and has a bore 249 to provide a bearing for the tubular shaft 236, journaled therein. Opposite the boss 248 is an upwardly extending boss 250, on the base wall 246, which is counterbored at 251 to provide a second bearing for the shaft 236. The web 247 provides a seat for bearing means which includes a ball bearing 252 having races 253, one of which is spaced from the hub 237 by a washer 254, of suitable fibrous insulating material, while a second washer 256, similar to the washer 254, spaces the remaining race from the web 247. While the bearing means, just referred to, sustains the turntable against downward displacement, upward displacement of the turntable is resisted by a third fibrous washer 257 on shaft 236 between the boss 248 and the pulley 159, which is rigidly secured to shaft 236. It will be noted that pulley 159 is in spaced relationship to the boss 250 and that the lower extremity of shaft 236 is also in spaced relationship to the bottom of counterbore 251. Thus the turntable 3 is axially anchored to the web 247 and boss 248, from which it is insulated by the fibrous washers 254, 256 and 257; that is, against the slight noise of rotation otherwise perceptible due to friction between adjacent parts when the turntable is rotating.

Although the spindle 9 is mounted within the tubular shaft 236 the spindle is in spaced relationship to the shaft. This is due, for one reason, to the fact that the internal diameter of shaft 236 is of substantially greater diameter than the diameter of the spindle. Additionally, it is due to the manner in which the spindle is supported, at one end thereof, from the base wall 246, centrally of the counterbore 251. To provide this support, the lower end of the spindle is of reduced diameter at 259 and threaded to receive a nut 261. Since a shoulder 262 is occasioned by the section 259, of reduced diameter, and said section passes through a hole 260 in the base wall 246, the nut 261 draws the shoulder 262 against the base wall 246 in which operation the nut is assisted by a lockwasher 263. For the purpose of holding the spindle 9 against forces tending to rotate it, and also as a convenience for assembling the spindle in effective relationship to the frame 127, the section 259 is provided with opposed flat surfaces 264 (Fig. 22) which are adapted to register with complementary flat surfaces 266 in the hole 260.

Having thus described my invention in an embodiment thereof, I am aware that numerous and extensive departures may be made therefrom without departing from the spirit or scope of my invention.

I claim:

1. An ejector head for an automatic record changer comprising a supported base plate, a rotatable plate in association with said base plate, trunnion portions on one of said plates, means on the other plate providing bearing surfaces for said trunnion portions, said means also providing cam surfaces, spring means adapted to engage said cam surfaces to urge one of said plates to either of two positions, said spring means also being adapted to tie said plates together, an ejector plate in association with and shorter than said rotatable plate, means to slidably anchor said ejector plate to said rotatable plate, resilient means to normally maintain said ejector plate central of said rotatable plate to provide seats on the ends of said rotatable plate for support of a record, and means to move said ejector plate from its central position to dislodge said record from either of said seats.

2. An ejector head for an automatic record changer comprising a supported base plate, a rotatable plate in association with said base plate, trunnion portions on one of said plates, means on the other plate providing bearing surfaces for said trunnion portions, said means also providing cam surfaces, spring means adapted to engage said cam surfaces to urge one of said plates to either of two positions, said spring means also being adapted to tie said plates together, an ejector plate in association with and shorter than said rotatable plate, means to slidably anchor said ejector plate to said rotatable plate, resilient means to normally maintain said ejector plate central of said rotatable plate to provide seats on the ends of said rotatable plate for support of a record, a pivoted clamp arm supported from said rotatable plate, a spring to urge said clamp arm toward either of said seats, and means to move said ejector plate from its central position to dislodge a record from either of said seats.

3. An automatic record changer having in combination with a driven turntable, record dispensing means to supply records to said turntable and a pickup arm to engage a record on said turntable; means to support said pickup arm including a tubular rock-shaft, means to rock said rock shaft, a pickup-arm-carrier rotatable relative to said rock shaft, an inclined bifurcated member carried by said pickup-arm-carrier, a rigid arm pivoted on the axis of said rock-shaft and in engagement with said bifurcated member, a drive pin rigidly coupled to said rock shaft to impart intermittent rotation to said rigid arm, an axially movable lift rod within said rock-shaft, means to slide said lift rod within said rock-shaft, a mobile plate drivingly coupled to said drive pin and adapted to be lifted axially of said pin by said lift rod, a drive portion on said mobile plate adapted to be engaged between the arms of said bifurcated member to provide driving engagement between said bifurcated member and said drive pin when said plate is in lifted position.

4. An automatic record changer having a driven turntable and a pickup arm to engage a record on said turntable, means to operatively support said pickup arm including a tubular rock shaft, drive pins rigidly coupled to said rock shaft, record dispensing means to supply records to said turntable, said dispensing means including an ejector head comprising a supported base plate above said rock shaft, an ejector shaft slidably journaled in said base plate, a mobile plate carried by said ejector shaft and drivingly associated with said drive pins, spring means to normally maintain said mobile plate adjacent said rock shaft, a rotatable plate in pivotal association with said base plate, resilient means to urge said plates together, means to releasably hold said rotatable plate in one of two positions relative to said base plate, an ejector plate slidably anchored to said rotatable plate, resilient means to normally provide a record-supporting seat on said rotatable plate adjacent said ejector plate, a crank member carried by said ejector shaft, abutment members normally above the plane of said crank member, an axially movable lift rod within said rock shaft, means to slide said lift rod within said rock shaft to lift said crank arm into the plane of said abutment members, means to rock said rock shaft thereby rotating said crank arm into engagement with one of said abutment members to dislodge a record from said record-supporting seat.

5. An automatic record changer comprising a stationary frame and a driven turntable supported by said frame, said turntable having a drive hub thereon, record dispensing means to provide for transfer of records therefrom to said turntable and a pivoted pickup arm to engage a record on said turntable, a tubular shaft to provide rotary support for said pickup arm, means to manipulate said pickup arm including a movable frame in slidable association with said stationary frame, an eccentrically pivoted wheel carried by said movable frame, means to advance said movable frame toward said drive hub, latch means coupled to said tubular shaft to establish holding engagement with said wheel, resilient means to initiate driving engagement of said wheel with said drive hub on disengagement of said latch from said wheel, said driving engagement providing for reciprocatory motion of said movable frame, said latch means being releasable in response to rotation of said pickup arm thereby providing for automatic rejection of a record, trigger means comprising a guide member, a slide member slidably anchored to said guide member, said slide member having a part adapted to engage said latch means, a pivoted trigger adapted to establish holding engagement with said slide member, means to communicate manual motion to said trigger to disengage said slide member therefrom, and spring means engaging said slide member to move said slide member upon release from said trigger, said part of said slide member being thereby carried into engagement with said latch means to release said latch means to reject a record.

6. In combination with an automatic record changer having a driven turntable, record dispensing means to supply records to said turntable and a pickup arm to engage a record on the turntable; means to operatively support said pickup arm comprising a rotatably supported tubular shaft, a spider rotatable on said shaft, pivotal members on said spider to pivotally support said pickup arm, a rigid arm adjacent said spider and pivotally supported on the axis of said tubular shaft, said rigid arm also being adapted to support said pickup arm, a lift cam adjacent said tubular shaft, a lift rod between said cam and said rigid arm to lift said arm and provide for vertical rocking motion of said pickup arm, means to swing said pickup arm laterally including a drive pin beside said rigid arm and rigidly coupled to said tubular shaft, said pin providing lost motion between said tubular shaft and said rigid arm, means to provide rotary coupling between said arm and said spider, a mobile plate adjacent said rigid arm, spring means to provide intimate association of said plate with said rigid arm, said plate being in driving association with said pin and movable axially thereof by said rigid arm, and a drive portion on said plate adapted to become engaged with said spider, when said plate is moved upward, to communicate rotary motion from said plate to said spider.

7. An automatic record changer comprising a stationary frame and a driven turntable supported by said frame, means including an ejector head to provide for transfer of records one-by-one from said dispensing means to said turntable and a pivoted arm to engage a record on said turntable, means to operatively manipulate said pickup arm including a movable frame, means to oscillate said movable frame relative to said stationary frame, latch means to interrupt oscillatory movement of said movable frame during playing of a record including a tubular shaft journaled in said stationary frame and extending toward said ejector head, and a lever rigidly mounted on said tubular shaft, said lever being adapted to be rocked by motion of said movable frame, a spider rotatably mounted on said tubular shaft, pivot members on said spider adapted to pivotally support said pickup arm, a pair of drive pins adjacent said spider and rigidly associated with said tubular shaft, a lift cam on said movable frame, a lift rod slidably journaled in said tubular shaft and in engagement with said cam, a rigid arm pivoted between said drive pins thereby providing lost motion between said pins and said arm, rotary coupling means in engagement with said rigid arm by which said coupling means is adapted to swing horizontally, said rigid arm being adaptable of motion axially of said drive pins by means including said lift rod to rock said pickup arm vertically about said pivot members, a spring in association with said rigid arm to resist rocking of said pickup arm, an axially movable ejector shaft journaled in the ejector head and extending toward said tubular shaft, a mobile plate rigidly mounted on said ejector shaft and in driving association with said drive pins, a drive portion on said mobile plate, being adapted to be moved into driving association with said rotary coupling means by said lift rod, and means to remove said drive portion from driving association with said drive means.

8. An automatic record changer comprising a stationary frame and a driven turntable supported by said frame, said turntable having a driving hub thereon, record dispensing means including an ejector head to provide for transfer of records one-by-one from said dispensing means to said turntable and a pivoted pickup arm to engage a record on said turntable, means to operatively manipulate said pickup arm including a movable frame slidably coupled to said stationary frame, an eccentrically pivoted wheel carried by said movable frame, means to advance said movable frame toward said hub, separate means to rotate said wheel into driving engagement with said hub, a stop slidably associated with said movable frame to interrupt rotation of said wheel, a tubular shaft journaled in the stationary frame and extending toward said ejector head, a lever rigidly mounted on said tubular shaft and linked to said stop, a finger carried by said movable frame and adapted to rock said lever as said wheel is rotated, a spider rotatably mounted on said tubular shaft, pivot members on said spider to pivotally support the pickup arm, a pair of drive pins adjacent said spider in rigid association with said tubular shaft, a lift cam on the movable frame, a lift rod slidably journaled in said sleeve and in engagement with said cam, a rigid arm pivoted between said drive pins thereby providing lost motion between said pins and said arm, rotary coupling means to swing said spider horizontally with said rigid arm, said rigid arm being adaptable of motion axially of said drive pins by means including said lift rod to rock said pickup arm vertically about said pivot members, a spring in association with said rigid arm to resist rocking of said pickup arm, an axially movable ejector shaft journaled in the ejector head and extending toward said tubular shaft, a mobile plate rigidly mounted on said ejector shaft and in driving association with said drive pins, a drive portion on said mobile plate, said drive portion being adapted to be moved into driving association with said rotary coupling means by said lift rod and spring means on said ejector shaft to remove said drive portion from driving association with said drive means.

9. In an automatic record changer having a stationary frame, a pickup arm on the frame and an actuating mechanism including a reciprocating frame slidable on said stationary frame, means to provide operation of said pickup arm by said actuating mechanism comprising, a tubular shaft rotatably journalled in said stationary frame, a spider rotatably mounted on said shaft, pivotal members on said spider for supporting said pickup arm, means to provide lost motion coupling between said tubular shaft and said spider including a pair of drive pins rigidly associated with said tubular shaft adjacent said spider, a rigid arm pivoted between said pins, means to provide rotary coupling between said arm and said spider so that said pickup arm may be swung laterally, a lift cam surface on said reciprocating frame, a lift rod between said cam and said rigid arm to rock said pickup arm vertically, a mobile plate adjacent said rigid arm, spring means to urge said plate into intimate association with said rigid arm, said plate being drivingly coupled to said pair of pins and movable axially thereof by said rigid arm, and a drive portion on said plate adapted to become engaged with said spider, when said plate is moved upward, to communicate rotary motion from said plate to said spider.

GEORGE E. REDFIELD.

References Cited in the file of this patent

UNITED STATES PATENTS

| Number | Name | Date |
|---|---|---|
| 1,938,810 | Collison et al. | Dec. 12, 1933 |
| 2,328,641 | Glaser | Sept. 7, 1943 |
| 2,331,383 | Faulkner | Oct. 12, 1943 |
| 2,352,331 | Leline | June 27, 1944 |
| 2,352,542 | Heins, Jr. | June 27, 1944 |
| 2,357,520 | Kahl | Sept. 5, 1944 |
| 2,370,875 | Pressley | Mar. 6, 1945 |
| 2,387,916 | Knox et al. | Oct. 30, 1945 |
| 2,395,026 | Weaver | Feb. 19, 1946 |
| 2,536,432 | Faulkner | Jan. 2, 1951 |